United States Patent
Minford et al.

[11] Patent Number: 5,949,944
[45] Date of Patent: Sep. 7, 1999

[54] APPARATUS AND METHOD FOR DISSIPATING CHARGE FROM LITHIUM NIOBATE DEVICES

[75] Inventors: William James Minford, Lehigh Township, Pa.; Ofer Sneh, Branchburg, N.J.

[73] Assignee: Lucent Technologies Inc., Murray Hill, N.J.

[21] Appl. No.: 08/942,286

[22] Filed: Oct. 2, 1997

[51] Int. Cl.$^6$ ........................................... G02B 6/10
[52] U.S. Cl. .................. 385/131; 385/131; 204/192.23; 204/192.26
[58] Field of Search ........................ 204/192.15, 192.23, 204/192.26, 192.27, 192.28; 382/129–132

[56] References Cited

U.S. PATENT DOCUMENTS

| | | | |
|---|---|---|---|
| 3,867,012 | 2/1975 | Phillips | 385/131 |
| 5,339,370 | 8/1994 | Sano et al. | 385/2 |
| 5,388,170 | 2/1995 | Heismann et al. | 385/4 |
| 5,396,363 | 3/1995 | Valette | 385/131 |
| 5,422,907 | 6/1995 | Bhargava | 372/68 |
| 5,566,258 | 10/1996 | Hatori et al. | 385/8 |

FOREIGN PATENT DOCUMENTS

| | | | |
|---|---|---|---|
| 62-173428 | 7/1987 | Japan | G02F 1/03 |

OTHER PUBLICATIONS

H. Nagata, et al, "Comments on fabrication parameters for reducing thermal drift on LiNbO sub 3 optical modulators", Society of Photo–Optical Instrumentation Engineers, Jan. 1997, pp. 283–286.

K. L. Chopram, S. Major and D. K. Pandya, "Transparent Conductors–A Status Review", Review Paper, Thin Solid Films, Electronics and Optics, 102 (1983), pp. 1,2,4,15–20.

*Primary Examiner*—Hung N. Ngo
*Attorney, Agent, or Firm*—John M. Harman

[57] ABSTRACT

Embodiments of the invention include an apparatus and method for stabilizing the operation of lithium niobate devices such as modulators due to charge accumulation caused by, e.g., pyroelectric and piezoelectride effects. The apparatus comprises a substrate having a waveguide formed therein, a buffer layer formed on the substrate, a $Si_2Ti_xN_{8/3+x}$ charge dissipation layer (CDL) formed on the buffer layer and a set of electrodes formed on the charge dissipation layer. According to embodiments of the invention, the $Si_2Ti_xN_{8/3+x}$ charge dissipation layer has a resistivity of approximately 15–150 kΩcm. Alternatively, the apparatus includes a second charge dissipation layer formed on the opposing surface of the substrate. The charge dissipation layer according to embodiments of the invention is advantageous in that it provides a suitable resistivity and is a composition that is easily reproducible using conventional formation techniques such as sputtering.

19 Claims, 2 Drawing Sheets

APPARATUS AND METHOD FOR DISSIPATING CHARGE FROM LITHIUM NIOBATE DEVICES

BACKGROUND OF THE INVENTION

1. Field of the Invention

The invention relates to lithium niobate devices. More particularly, the invention relates to dissipating accumulated charge on the dielectric surfaces of lithium niobate devices.

2. Description of the Related Art

Electrooptic devices employing materials such as lithium niobate often are used as modulators, e.g., within fiber optic communication systems, for signal processing applications, and as sensors. These modulators include, e.g., optical intensity modulators, switches, phase or frequency shifters, polarization transformers and wavelength filters.

An operational shortcoming of these devices is temperature and pressure dependence within the devices. More specifically, these lithium niobate devices typically suffer from charge accumulation brought about by the self biasing effects resulting from, e.g., pyroelectric and/or piezoelectric effects within the devices. Conventional attempts to dissipate the accumulated charge via the deposition of a charge dissipation layer have not yielded satisfactory results.

For example, in U.S. Pat. No. 5,388,170, which is co-owned with this application and is assigned to the assignee of this application, a charge dissipation layer formed on the bottom or back side of the device (i.e., the non-electrode side of the device). The charge dissipation layer is made of a "metal" and/or a "semiconductor material". Also, disclosed in U.S. Pat. No. 5,388,170 is a charge dissipation layer, made of indium tin-oxide (ITO) or polycrystaline silicon, formed on the electrode side of the device. However, such configuration is difficult to fabricate consistently and it is uncertain whether the claimed resistivity values can be achieved (see, H. Nagata, et al., "Comments on fabrication parameters for reducing thermal drift on LiNbO$_3$ optical modulators", *Society of Photo-Optical Instrumentation Engineers*, January 1997, pp. 283–286).

Also, Fujitsu apparently has disclosed the use of a polysilicon charge dissipation layer (see, Japanese Patent Application No. Sho 62[1987]-173428). However, such high reported resistivity values are not realistic for polysilicon and result from some partial oxidation of the film. These partially oxidized polysilicon films are achieved, e.g., by elevated temperature partial oxidation, which is a poorly controlled process. Thus, at times the films will have the proper resistivity but at other times the resistivity of the films will be unacceptable. Accordingly, the use of "as deposited" oxygen or nitrogen contaminated films and their reproducible resistivities has been desired but heretofore has not provided satisfactory results.

It would be desirable to have available a method and apparatus for dissipating the accumulated charge on lithium niobate devices such as lithium niobate modulators.

SUMMARY OF THE INVENTION

The invention is embodied in an apparatus and method for stabilizing the operation of lithium niobate devices such as modulators due to charge accumulation caused by, e.g., pyroelectric and piezoelectride effects. The apparatus comprises a substrate having a waveguide formed therein, a buffer layer formed on the substrate, a $Si_2Ti_xN_{8/3+x}$ charge dissipation layer (CDL) formed on the buffer layer and a set of electrodes formed on the charge dissipation layer. According to embodiments of the invention, the $Si_2Ti_xN_{8/3+x}$ charge dissipation layer has a resistivity of approximately 15–150 kΩcm. Alternatively, the apparatus includes a second charge dissipation layer formed on the opposing surface of the substrate. The charge dissipation layer according to embodiments of the invention is advantageous in that it provides a suitable resistivity and is a composition that is easily reproducible using conventional formation techniques such as sputtering.

DETAILED DESCRIPTION

Figure 1:
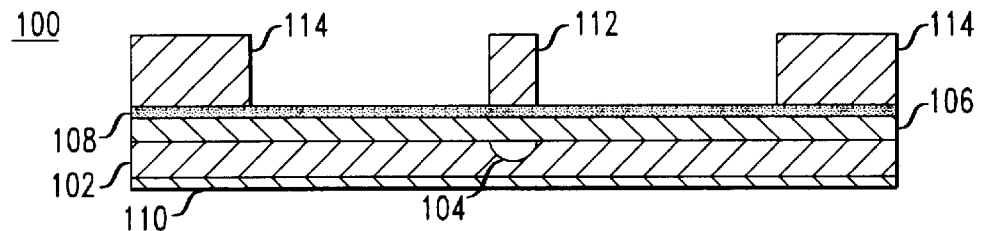
FIG. 1 is a simplified, cross-sectional view of a lithium niobate device according to an embodiment of the invention.

In the following description similar components are referred to by similar reference numerals in order to enhance the understanding of the invention through the description of the drawings.

Although specific features, configurations and arrangements are discussed hereinbelow, it should be understood that such is done for illustrative purposes only. A person skilled in the relevant art will recognize that other configurations, arrangements and steps can be used without departing from the spirit and scope of the invention.

Referring now to FIG. 1, a lithium niobate device 100 according to an embodiment of the invention is shown. Device 100 includes a substrate 102 made of lithium niobate (LiNbO$_3$), a waveguide 104 formed in substrate 102, and a buffer layer 106 formed on substrate 102. Buffer layer 106 is made of, e.g., silicon dioxide (SiO$_2$) or doped SiO$_2$ and typically is formed in a conventional manner to a thickness within the range from approximately 3500 angstroms (Å), which is required to avoid light attenuation by the later-formed electrodes, to approximately 1–1.5 microns ($\mu$m), which is necessary to better match the optical and microwave propagation velocities.

A first charge dissipation layer 108 (CDL) is formed on the front or top surface of buffer layer 106, as shown. Also, a second charge dissipation layer 110 is formed on the back or bottom surface of substrate 102, as shown. As will be discussed in greater detail hereinbelow, according to embodiments of the invention, charge dissipation layers 108, 110 are made of an anti-static material based on an $Si_2Ti_xN_{8/3+x}$ ceramic. Also, one or more electrically conducting electrodes, e.g., hot line electrode 112 and ground electrodes 114, are formed on the surface of charge dissipation layer 108. Buffer layer 106 separates electrodes 112 and 114 from the optical fields in waveguide 108 to avoid the attenuation of the optical fields. It should be understood that, except for the novel charge dissipation layer, lithium niobate devices according to embodiments of the invention can have conventional structure.

Lithium niobate devices, in addition to providing excellent electrooptic properties, inherently suffer from several deleterious effects. For example, self biasing is induced across the lithium niobate material as a result of temperature variations within the device (i.e., a pyroelectric effect) or as a result of pressure or stress variations within the device (i.e., a piezoelectric effect). The self-biasing generates charge separation across the material and causes charge accumulation at the surfaces of the lithium niobate material and at its interfaces. Such detrimental effects occur despite reductions in residual and thermally-built stress effects (e.g., humidity and atmospheric pressure) brought about by technology advances in packaging, including hermetically-sealed packaging.

In typical lithium niobate devices (e.g., device 100), voltage is applied between electrode 112 and ground electrodes 114 to affect the refractive index of waveguide 104 and thus controllably alter the phase of the light guided through waveguide 104. However, the accumulation of charge at the surface and interface regions of substrate 102 between electrode 112 and electrodes 114 induces a strong fringing field that adversely affects the refractive index of waveguide 104 and subsequently alters the phase of the guided mode through waveguide 104 in a less than controllable manner.

In general, the solution to this problem is to dissipate the charge. For example, providing a conductive path in the gaps between the electrodes suppresses the accumulated charge. However, this conductive path must have a limited conductivity to avoid shorting the electrodes. Typically, the resistance of the charge dissipation path should not exceed the maximum current that is capable of being drawn from the device control circuit. Accordingly, for a lithium niobate device that draws up to approximately 1 mA from the control circuit, the resistance of the charge dissipation layer should be greater than approximately 1000 $\Omega$ (1 k$\Omega$). Practically, the current should be reduced by several orders of magnitude to be less than approximately 1 $\mu$A.

Figure 2:
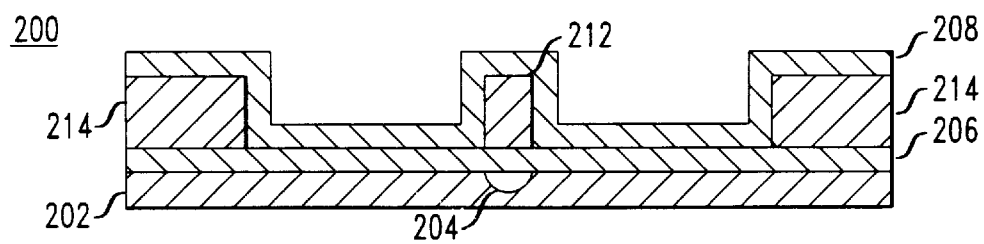
FIGS. 2–3 are simplified, cross-sectional views of lithium niobate devices according to conventional configurations.

Conventional arrangements attempting to dissipate the accumulated charge are shown, e.g., in FIGS. 2–3 and described hereinbelow. In FIG. 2, a lithium niobate device 200 is shown with a charge dissipation region in the form of a semi-insulating film of indium tin-oxide (ITO) 208. Device 200 includes a lithium niobate substrate 202, a waveguide 204 formed in substrate 202, and a buffer layer 206 formed on substrate 202. Electrodes 212, 214 are formed on buffer layer 206, as shown. ITO film 208 is formed to a thickness of approximately 1000 Å over electrodes 212, 214 and buffer layer 206.

However, when used in lithium niobate devices such as Mach-Zehnder interferometric modulators, ITO film 208 may adversely affect the modulator's high-frequency operation. Also, ITO film 208 typically is unstable due to photoconductivity. Furthermore, the film resistivities of ITO films are too conductive under conventional preparation procedures. Therefore, consistently producing antistatic ITO films with resistivities higher than approximately 1 k$\Omega$cm is difficult.

Figure 3:
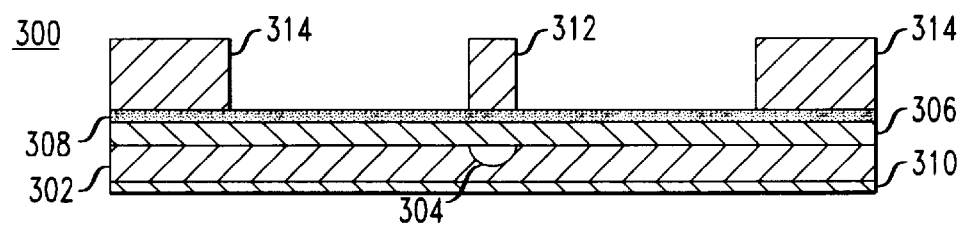

Another conventional arrangement that attempts to dissipate accumulated charge within lithium niobate devices is shown in FIG. 3. A lithium niobate device 300 includes a substrate 302 made of lithium niobate, a waveguide 304 formed in substrate 302, a buffer layer 306 formed on top of substrate 302, a silicon film 308 formed on top of buffer layer 306 and electrodes 312, 314 formed on silicon film 308.

An alternative arrangement includes a second charge dissipation layer 310 formed on the bottom surface of device 300, more specifically on the bottom surface of substrate 302, as shown. Layer 310 is formed using a conventional method, such as sputtering, to a thickness of approximately 500–2000 Å. Layer 310 is disclosed in U.S. Pat. No. 5,388,170 as being made of a metal, such as aluminum or gold, or other conductive materials (such as semiconductors) that are suitable for depositing on substrate 302.

Unlike conventional arrangements, embodiments of the invention are based on the realization that the novel use of a $Si_2Ti_xN_{8/3+x}$ ceramic material for dissipating charge accumulated within lithium niobate devices produces results superior to those of conventional charge dissipation layers. In addition to providing any resistivity within the range from approximately $10^4$ $\Omega$cm to approximately $10^9$ $\Omega$cm, the $Si_2Ti_xN_{8/3+x}$ charge dissipation layer according to embodiments of the invention is consistently reproducible and thus generates yields much greater than conventional methods of fabricating lithium niobate devices with charge dissipation layers therein.

Figure 4:
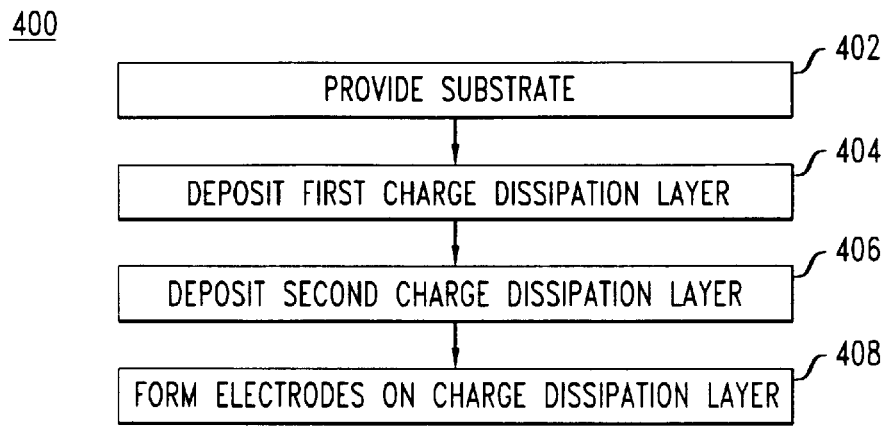
FIG. 4 is a simplified block diagram of a method for dissipating charge accumulated on lithium niobate devices according to an embodiment of the invention.

Referring to FIG. 4, a method 400 is shown for fabricating lithium niobate devices according to embodiments of the invention. A first step 402 includes providing a substrate, such as substrate 102. The substrate typically has a waveguide pattern formed therein. The waveguide is formed, e.g., by titanium (Ti) in-diffusion into the z-surface of the lithium niobate substrate. The substrate may or may not have a buffer layer (e.g., buffer layer 106) formed thereon. As mentioned previously herein, buffer layers are used to separate the optical waveguide formed in the substrate from the later-formed electrodes.

The second step 404 in method 400 is to form the charge dissipation layer on the buffer layer. As mentioned previously herein, the resistance of the charge dissipation layer should have a specific value to optimize performance. Resistance values lower than 1 k$\Omega$ will draw more than 1 mA from the control circuit, which is beyond the typical specifications. Normally, a suitable CDL should not draw more than approximately 1 $\mu$A. Also, the thickness of the charge dissipation layer should be kept to the minimum necessary. Keeping the charge dissipation layer thickness to an acceptable minimum reduces the possible impact of the charge dissipation layer CDL on the radio frequency (RF) performance and the high speed operating performance of the lithium niobate device.

According to embodiments of the invention, the charge dissipation layer is made of a $Si_2Ti_xN_{8/3+x}$ ceramic material. The charge dissipation layer is deposited, e.g., by sputtering or other suitable technique to a thickness approximately 800–2000 Å.

In one embodiment of the invention, the $Si_2Ti_xN_{8/3+x}$ charge dissipation layer is formed by reactive sputtering in a nitrogen-argon ($N_2$—Ar) gas mixture (flow ratio in units of standard cubic cm). At low $N_2$:Ar gas flow ratios, e.g., within the range from approximately 1:100 to approximately 5:100, the deposited $Si_2Ti_xN_{8/3+x}$ charge dissipation layer is not fully nitridized. However, at high $N_2$:Ar gas flow ratios, e.g., within the range from approximately 6:100 to greater than approximately 1:1, the deposited $Si_2Ti_xN_{8/3+x}$ charge dissipation layer is fully nitridized and resulting resistivity thereof becomes dependent solely on the deposition RF power. In this manner, the film being deposited is effectively insensitive to the $N_2$:Ar gas ratio and thus its resistivity is easier to control.

According to experimental results, charge dissipation layers made of a $Si_2Ti_xN_{8/3+x}$ in accordance with embodiments of the invention have demonstrated well controlled resistivities within the range from approximately $10^4$ Ωcm to approximately $10^9$ Ωcm, which clearly is suitable for purposes of dissipating charge accumulated within different types of lithium niobate devices. For example, the results for high speed intensity modulators seem to be better when the resistivity of the charge dissipation layer is within the range from approximately 15 kΩcm to approximately 150 kΩcm.

The use of $Si_2Ti_xN_{8/3+x}$ as a charge dissipation layer in accordance with embodiments of the invention is the result of many considerations. For example, the charge dissipation layer is deposited on top of the amorphous buffer layer film. Therefore, the charge dissipation layer is expected to be amorphous or polycrystalline. Amorphous or polycrystalline semiconductors, including conductive oxides such as indium oxide ($In_2O_3$), zinc oxide (ZnO), indium tin-oxide (ITO) and cadmium tin-oxide ($Cd_2SnO_4$), display morphology dependent resistivity due to multiple defect sites and grain boundary surfaces. Accordingly, these films would rarely have resistivity values higher than $10^2$ Ωcm. Also, insulators such as aluminum oxide ($Al_2O_3$), silicon dioxide ($SiO_2$), or silicon nitride ($Si_3N_4$) are highly resistive and will have residual morphologically-dependent conductivity but will rarely display resistivity values below $10^{12}$ Ωcm.

However, according to embodiments of the invention, the insulating and semiconducting ceramic materials are blended to obtain the appropriate conductivity. Also, in general, nitride materials are more attractive than oxides because, as a top layer coating, nitrides also provide a hermetic passivation layer. In addition, nitride materials are excellent barriers to electromigration.

In general, silicone nitride is a good insulator. Also, titanium nitride is an excellent conductor, with resistivity values lower than of $10^{-4}$ Ωcm. It is possible to prepare a ceramic film composed of silicon nitride and titanium using techniques such as reactive sputtering. In this manner, the composition of the film $(Si_3N_4)_x(TiN)_y$ can be manipulated to obtain theoretical resistivity values between, e.g., $\rho=10^{16}$ Ωcm (x=100%) to $\rho=10^{-4}$ Ωcm (y=100%).

However, other factors beside composition determine the actual resistivity of the composite film. Such factors include morphology, crystallinity and the degree of mixing. Because it is possible to manipulate sputtering processes to control morphology, crystallinity and material mixing, the combination of sputtering with an adjustable $(Si_3N_4)_x(TiN)_y$ composition has enough parameters capable of manipulation to achieve the target resistivities within a reproducible process.

It should be understood that other materials are suitable for use as sputtering targets in forming the charge dissipation layer according to embodiments of the invention. Such materials include, e.g., one or more titanium silicides or mosaic structures including all or part of the following: $Si_2Ti_xN_{8/3+x}$ ceramic, titanium (Ti), silicon nitride ($Si_3N_4$), titanium nitride (TiN), and titanium silicide ($Si_2Ti$).

A third step 406 of method 400 includes forming a second charge dissipation layer 110 on the bottom or back side of substrate 102. Second charge layer 110 is made of, e.g., a $Si_2Ti_xN_{8/3+x}$ ceramic material, and is formed to a thickness of approximately 800–2000 Å by sputtering or other suitable technique.

A fourth step 408 of method 400 includes forming electrodes such as hot line electrode 112 and ground electrodes 114 on the charge dissipation layer. Such electrodes typically are approximately 4 centimeters (cm) long and are formed in a symmetrical configuration, with hot line electrode 112 located between two ground electrodes 114 that are spaced approximately 10–20 μm from hot line electrode 112. Such arrangement often is necessary to meet required input impedances. The electrodes are made of any suitable conducting material, e.g., gold or aluminum, and are formed to a thickness, e.g., within the range from approximately 1.5 μm to approximately 30 μm.

Figure 5A:
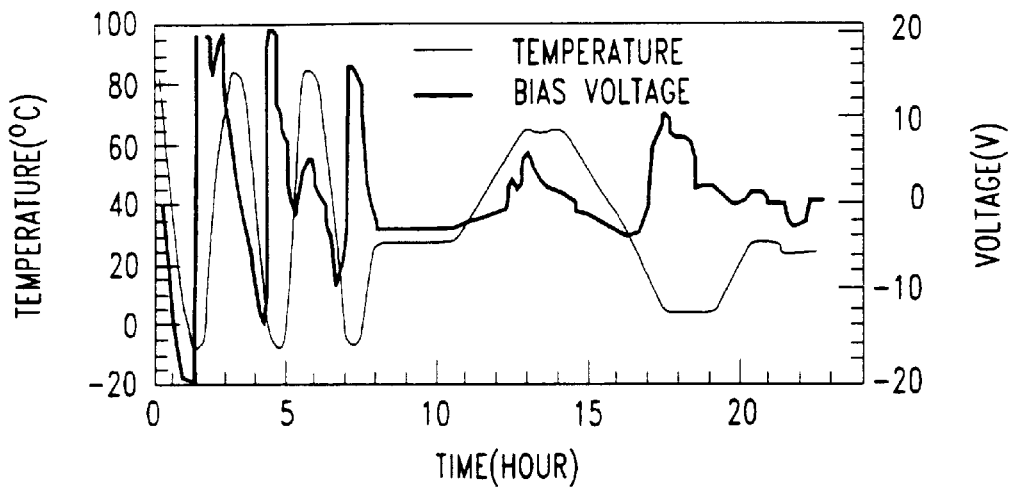
FIG. 5a is a graphical view of the bias voltage as a function of temperature over time of a conventional lithium niobate device.
Figure 5B:
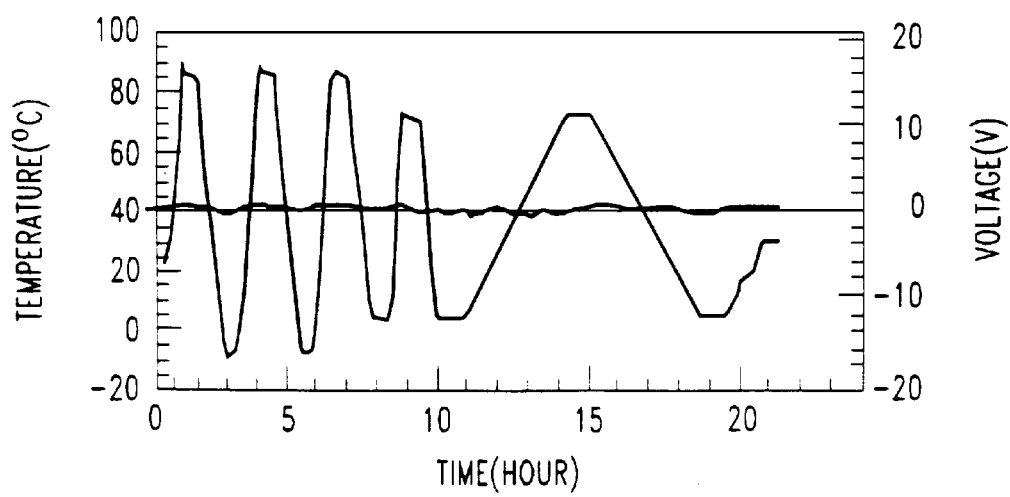
FIG. 5b is a graphical view of the bias voltage as a function of temperature over time of a lithium niobate device in accordance with embodiments of the invention.

Referring now to FIGS. 5*a–b*, some results of a charge dissipation layer according to embodiments of the invention are shown. For example, the effect of temperature on a 10 Gb/s lithium niobate intensity modulator without charge dissipation layers and with charge dissipation layers according to an embodiment of the invention (FIG. 1) are graphically illustrated. A test was generated to vary the ambient temperature and to compensate for the pyroelectricity-driven phase drift by changing the DC bias to hold the device on a constant phase. Under the test condition, the device without the charge dissipation layers could not be controlled because the required voltage was far beyond the ±20 volts available from the control circuit. As can be seen, the use of a charge dissipation layer, e.g., made of $Si_2Ti_xN_{8/3+x}$, has, in this case, virtually eliminated the temperature induced bias drift that typically plagues conventional modulators of this kind.

The significant suppression of the bias swing in this illustration should be noted. Also, it should be noted that without the charge dissipation layer, the devices essentially fail because the thermally driven bias drift goes beyond the limits of the control circuit, which typically is approximately ±20 V. In addition to the favorable results of charge dissipation layers according to embodiments of the invention, it should be remembered that such charge dissipation layers are easily reproduced compared to conventional charge dissipation layers.

It will be apparent to those skilled in the art that many changes and substitutions can be made to the embodiments of the charge dissipation methods and devices herein described without departing from the spirit and scope of the invention as defined by the appended claims and their full scope of equivalents. For example, it is possible to employ embodiments of the invention in devices wherein most of the z- surface of the substrate is not covered with electrodes. The $Si_2Ti_xN_{8/3+x}$ charge dissipation layers as discussed herein also suppress the pyroelectrically-induced bias drift on these devices as well. Consequently, the constraint of covering as much of the z- area of the device as possible with gold to minimize the pyroelectric effect is eliminated. Also, the ground plains are capable of being designed better to match the 50 Ω impedance of, e.g., a radio frequency (RF) modulation line.

What is claimed is:

1. An optical device, comprising:
   a substrate having a waveguide formed therein;
   a first charge dissipation layer (CDL) formed on at least a portion of a first side of said substrate; and
   a plurality of electrodes formed on at least a portion of at least one of said charge dissipation layers,
   wherein at least a portion of at least one of said charge dissipation layers is made of $Si_2Ti_xN_{8/3+x}$ and wherein said charge dissipation layers dissipate charge accumulated on the dielectric surfaces of said device.

2. The device as recited in claim 1, wherein resistivity of said charge dissipation layer is greater than approximately $10^4$ Ωcm.

3. The device as recited in claim 1, wherein the resistivity of said charge dissipation layer is within the range from approximately 15,000 Ωcm to approximately 150,000 Ωcm.

4. The device as recited in claim 1, wherein the thickness of said charge dissipation layer is within the range from approximately 800 angstroms (Å) to approximately 2000 angstroms (Å).

5. The device as recited in claim 1, wherein at least a portion of said substrate is lithium niobate.

6. The device as recited in claim 1, further comprising a second charge dissipation layer (CDL) formed on at least a portion of an opposing, second side of substrate.

7. The device as recited in claim 1, further comprising a buffer layer formed between at least a portion of said first side of said substrate and at least a portion of said first charge dissipation layer.

8. The device as recited in claim 7, wherein at least a portion of said buffer layer is silicon dioxide ($SiO_2$).

9. The device as recited in claim 7, wherein the thickness of said buffer layer is within the range from approximately 3500 angstroms (Å) to approximately 1.5 microns ($\mu$m).

10. A lithium niobate device, comprising:
    a substrate having a waveguide formed therein, at least a portion of said substrate being made of lithium niobate;
    a buffer layer formed on at least a portion of a first side of said substrate;
    a charge dissipation layer (CDL) formed on at least a portion of said buffer layer; and
    a plurality of electrodes formed on at least a portion of said CDL, at least one of said electrodes formed on said CDL at a location over said waveguide,
    wherein said charge dissipation layer is made of $Si_2Ti_xN_{8/3+x}$ and wherein said charge dissipation layer dissipates charge accumulated within said device by at least one of a pyroelectric effect and a piezoelectric effect.

11. The device as recited in claim 10, wherein resistivity of said charge dissipation layer is greater than approximately $10^4$ $\Omega$cm.

12. The device as recited in claim 10, wherein the resistivity of said charge dissipation layer is within the range from approximately 15,000 $\Omega$cm to approximately 150,000 $\Omega$cm.

13. The device as recited in claim 10, wherein the thickness of said charge dissipation layer is within the range from approximately 800 angstroms (Å) to approximately 2000 angstroms (Å).

14. The device as recited in claim 10, wherein at least a portion of said buffer layer is silicon dioxide ($SiO_2$).

15. The device as recited in claim 10, wherein the thickness of said buffer layer is within the range from approximately 3500 angstroms (Å) to approximately 1.5 microns ($\mu$m).

16. The device as recited in claim 10, further comprising a second charge dissipation layer (CDL) formed on at least a portion of an opposing, second side of said substrate.

17. A method for stabilizing operation of a lithium niobate device due to accumulated charge, said lithium niobate device including a substrate having a first surface and an opposing, second surface, a waveguide formed in said substrate, and a buffer layer formed on said first surface of said substrate, said method comprising the steps of:
    forming a charge dissipation layer on said buffer layer, wherein at least a portion of said charge dissipation layer is made of $Si_2Ti_xN_{8/3+x}$; and
    forming electrodes on said charge dissipation layer.

18. The method as recited in claim 17, wherein said charge dissipation layer is formed by sputtering.

19. The method as recited in claim 17, further comprising the step of forming a second charge dissipation layer on the bottom surface of said substrate.

* * * * *